Aug. 30, 1932.  W. FERRIS  1,874,266
HYDRAULIC FEED FOR LATHES AND THE LIKE
Filed Aug. 5, 1926  2 Sheets-Sheet 1
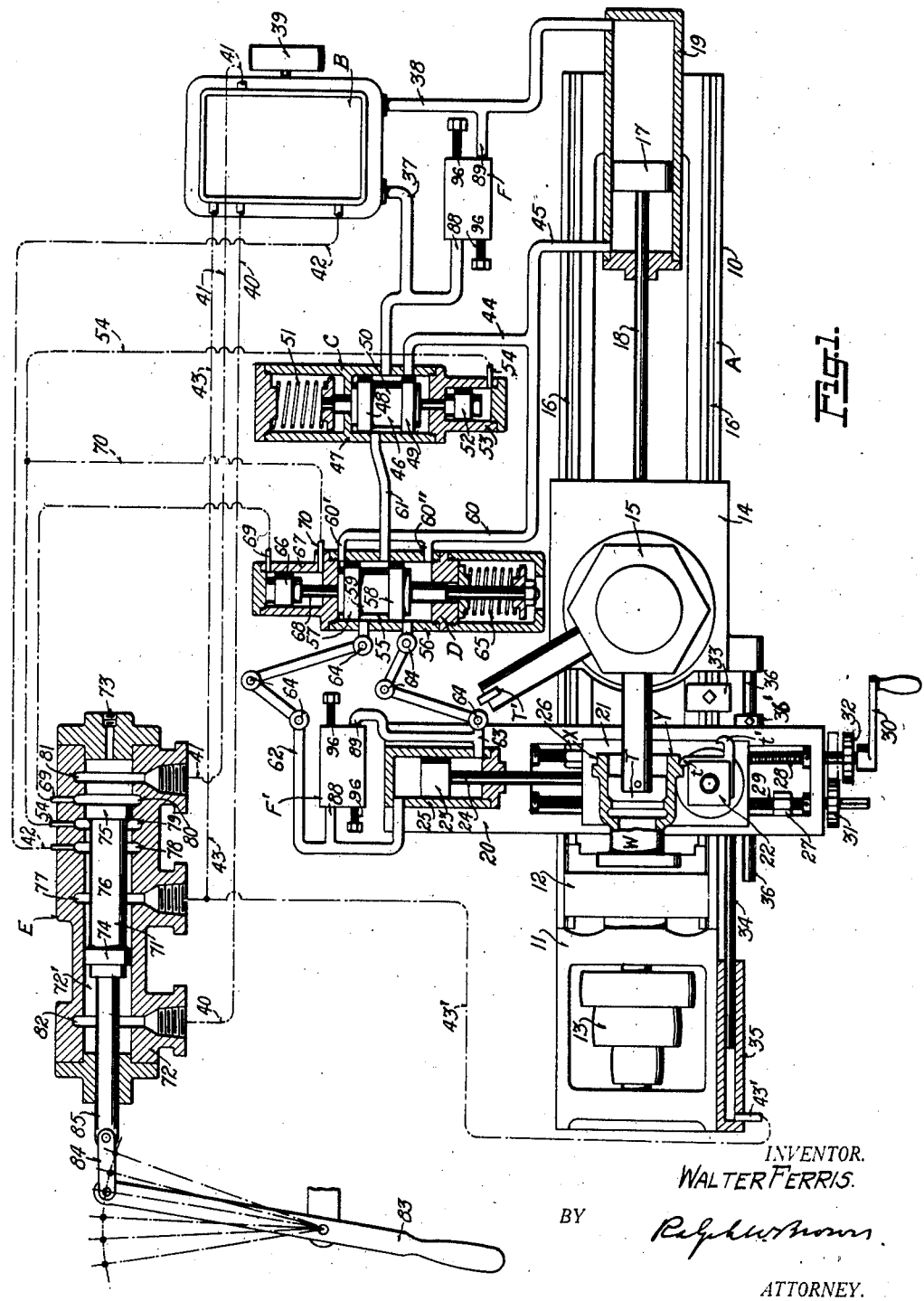
INVENTOR.
WALTER FERRIS.
BY
ATTORNEY.

Aug. 30, 1932.          W. FERRIS          1,874,266
HYDRAULIC FEED FOR LATHES AND THE LIKE
Filed Aug. 5, 1926     2 Sheets-Sheet 2
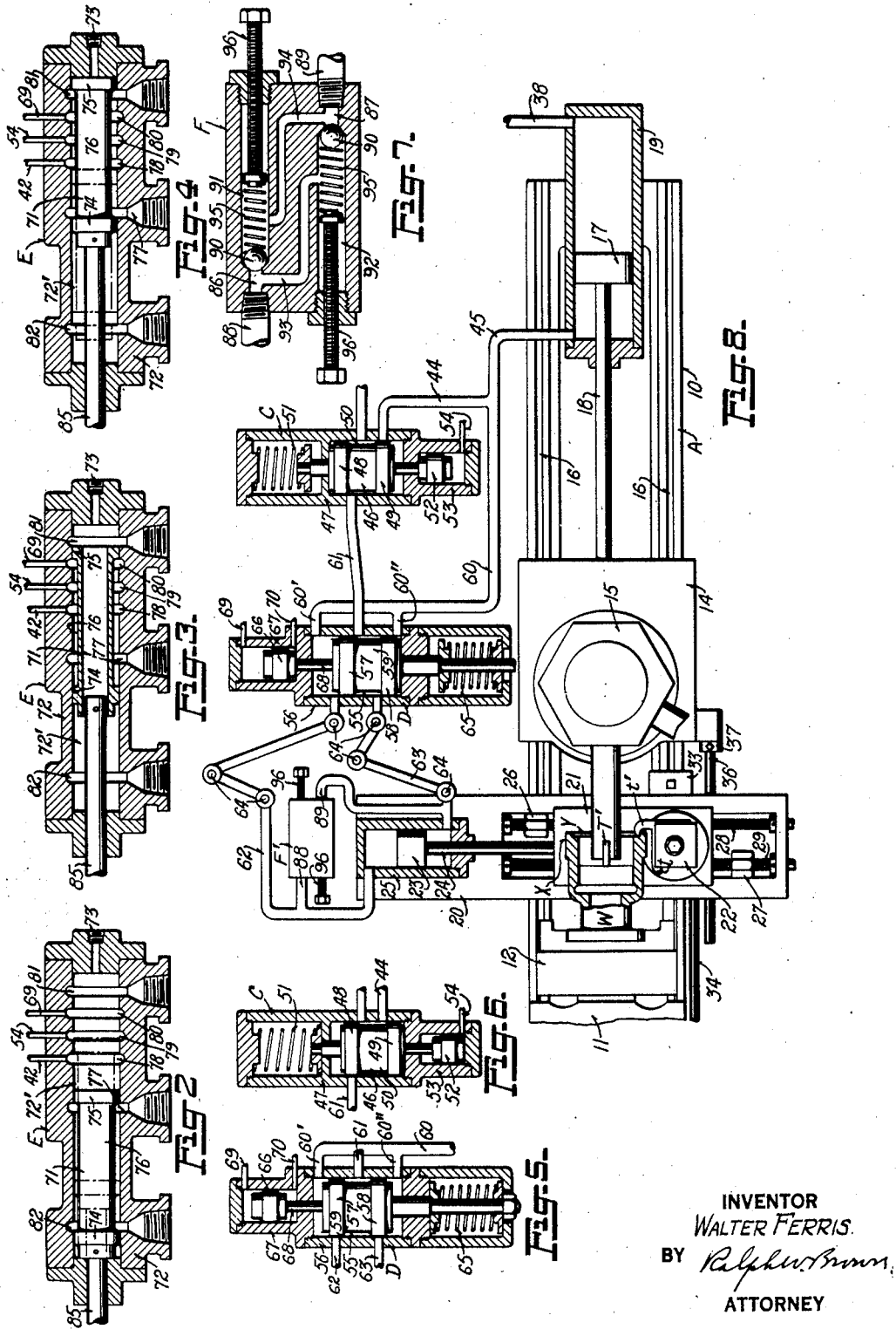
INVENTOR
WALTER FERRIS.
BY
ATTORNEY Patented Aug. 30, 1932

1,874,266

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

HYDRAULIC FEED FOR LATHES AND THE LIKE

Application filed August 5, 1926. Serial No. 127,308.

This invention relates to hydraulic feeds for effecting the controlled operation of two or more parts of a machine tool or the like.

For purposes of illustration and explanation the invention will be described as applied to a multiple turret lathe for feeding the tool carriages, although it may be advantageously employed in other machines for similar purposes.

One object of the present invention is the provision of a hydraulic system for feeding each of a plurality of independent parts of a machine tool or the like, with an accurate control of the rate of movement and positioning of each part. In carrying out this object the several parts are driven by individual hydraulic motors, constituting parts of a hydraulic system which is supplied with driving liquid from a pump mechanism capable of delivering liquid at regulated rates. By the use of valves one or more of the motors may be thrown into operation, and by connecting the motors in series they may be simultaneously operated at regulated speeds dependent upon the rate of discharge from the pump mechanism.

Other objects and advantages will appear from the following description of an illustrative embodiment of the present invention.

In the drawings:—

Figure 1 is a diagrammatic plan view of a turret lathe equipped with a hydraulic feed system embodying the present invention.

Figs. 2, 3, and 4 are longitudinal sectional views of the main control valve shown in Figure 1, illustrating various positions thereof.

Fig. 5 is a sectional view of a reversing valve employed.

Fig. 6 is a sectional view of a switch valve employed.

Fig. 7 is a sectional view of a high pressure relief valve.

Fig. 8 is a plan view of the lathe of Figure 1 with the parts adjusted for a somewhat different operation.

The turret lathe, shown at A in Figures 1 and 8, includes the usual bed 10, head stock 11, and chuck 12 rotated in the usual manner by the cone pulleys 13. A tool carriage 14, supporting the usual turret 15, is mounted to travel upon the longitudinal ways 16 toward and from the chuck. The carriage 14 in this instance is driven by a piston 17, connected to the carriage through a rod 18, and fitted for reciprocation in a motor cylinder 19 fixed in the bed of the lathe.

A cross slide 20 is also mounted for travel along the ways 16 between the head stock 11 and carriage 14. A second tool carriage 21, mounted in the usual manner for travel lengthwise of the cross slide 20, carries a second turret 22. In the machine shown the carriage 21 is driven by a piston 23, connected thereto by a rod 24, and fitted for reciprocation in a motor cylinder 25, fixed to the cross slide 20. Two adjustable stops 26 and 27 determine the extent of movement of the carriage 21 along the cross slide. The stops shown are in the form of nuts guided in the table and threaded upon screws 28 and 29, respectively, journaled in the cross slide and retained against lengthwise movement therein. The screws are normally independently rotatable, by any appropriate means, such as a removable crank 30, so that either stop 26 or 27 may be adjusted into any desired position.

Provision is also made in the machine shown by which the stops 26 and 27 and the screws 28 and 29 may be utilized as a hand feed for the carriage 21. In this instance, the screws carry gears 31 and 32 one of which may be shifted into mesh with the other, as indicated in dotted lines in Figure 1, so as to effect a simultaneous rotation of both screws. By an independent rotation of the screws both stops 26 and 27 may be adjusted into engagement with the opposite ends of the carriage, after which the gear 32 may be shifted into mesh with the gear 31 so as to cause the screws to rotate simultaneously and thereby simultaneously shift both stops in either direction with a consequent adjustment of the cross slide. In order to insure movement of both stops in the same direction the screws are oppositely threaded.

As above noted the cross slide 20 is mounted for travel along the ways 16. A stop 33 adjustably fixed on one of the ways limits movement of this cross slide toward the right. A plunger 34 connected to the cross slide and closely fitted for reciprocation in a cylinder 35, fixed to the bed of the machine, maintains a yielding thrust against the cross table tending to shift it toward the stop 33. The cross slide is shifted in the other direction by the advance of the carriage 14. For this purpose the carriage 14 carries a forwardly extended push rod 36, fixed thereto, and a stop collar 36' adjustably fixed to the rod, projects upwardly into the plane of the cross slide. The collar 36' may be so adjusted that, as the carriage 14 reaches a selected point in its advance toward the left, the collar engages the cross slide 20, causing the same to thereafter move toward the left with and in advance of the carriage.

The motor cylinders 19 and 25 constitute parts of a hydraulic system fed by a pump mechanism of appropriate type. The pump mechanism, indicated at B, is of the type fully described in my copending application, Serial No. 87,791, filed February 12, 1926, and is shown connected to the two sides of the main power circuit through pipes 37 and 38. It will suffice here to state that the pump mechanism is driven at constant speed through any appropriate means such as a pulley 39, and the rate and direction of liquid discharged by the pump mechanism is controlled by the application of fluid pressure to control pipes 40, 41 and 42. Where no pressure exists in any of these three pipes pump displacement is zero and there is no flow of liquid in pipes 37 and 38. When fluid pressure is applied to pipe 40, the pump discharges liquid at a high rate through pipe 37, and receives liquid through pipe 38; when fluid pressure is applied to pipe 41 the pump discharges liquid at a high rate through pipe 38 and receives liquid through pipe 37; and when fluid pressure is applied to pipe 42 the pump discharges liquid at a relatively low but accurate rate through pipe 38 and receives liquid through pipe 37. The pump maintains a pressure in a pipe 43 regardless of the conditions in pipes 40, 41 or 42. Since the various instrumentalities for effecting the above results are fully described in the application hereinabove mentioned, and since the particular means employed for this purpose is not claimed herein, a further detailed description of the pump mechanism is deemed unnecessary.

In the hydraulic system illustrated pipe 38 is in open communication with the right end of motor cylinder 19, and a switch valve C controls communication between pipe 37 and a pipe 44 which communicates with the left end of cylinder 19, through a pipe 45. The valve C may assume various forms. The valve shown comprises a piston element 46 closely fitted for reciprocation in a cylindrical bore of a casing 47. The piston is formed with two spaced heads 48 and 49 connected by a reduced portion 50. The piston is designed to assume two positions, namely; the lower position of Figure 6, in which position pipe 44 is open to the annular space surrounding the reduced portion 50; and the upper position of Figure 1, in which position pipe 44 is closed by the lower head 49. In both positions of the piston, pipe 37 is open to the annular space surrounding the reduced portion 50, so that when the piston is in its normal lower position, pipe 37 communicates with pipe 44, and when the piston is elevated pipe 44 is cut off from pipe 37. A spring 51 yieldably maintains the piston in the lower position, and any appropriate means, such as a piston 52 and cylinder 53 are employed for raising the piston. In this instance fluid pressure may be applied to the lower end of cylinder 53 through a pipe 54 in a manner to be later described.

The motor cylinder 25 is controlled by a reversing valve D of appropriate form. The valve shown for this purpose includes a piston 55 closely fitted for reciprocation in a bore formed in a casing 56. The piston 55 is provided with two spaced heads 57 and 58 connected by a reduced portion 59. A pipe 60, communicating with pipe 45, is provided with branches 60' and 60" which communicate with the opposite ends of the bore. A pipe 61 leading from the switch valve C communicates at all times with the annular space surrounding the reduced portion 59 of the piston. This pipe is controlled by the upper head 48 of piston 46, so that when piston 46 is elevated pipe 61 communicates with pipe 37 and when the piston is lowered pipe 61 is blocked by the head 48. A pipe 62 leading from valve D to the upper end of cylinder 25 is controlled by the upper head 57 of piston 55; and a pipe 63 leading to the lower end of cylinder 25 is controlled by the lower head 58. Appropriate swivel joints 64 in pipes 62 and 63 permit movement of the cylinder 25 with the cross slide 20.

The piston valve 55 may assume either of three positions, namely: an intermediate position, as indicated in Figure 5, in which position pipes 62 and 63 are closed by heads 57 and 59; a lower position, as indicated in Figure 8, in which position pipe 62 is open to pipe 60 and pipe 63 is open to pipe 61; and an upper position as indicated in Figure 1, in which position pipe 62 is open to pipe 61 and pipe 63 is open to pipe 60. A spring 65 acts in a well known manner to yieldably retain the piston in intermediate position. A piston 66 working in a cylinder 67 is employed in the instance to raise or lower the valve from intermediate position. It will be noted that the area of the lower face of piston 66 is somewhat less than the upper face thereof, due to the piston rod 68, so that when pressure is applied to both ends of cylinder 67, through pipes 69 and 70, the piston lowers, and when pressure is applied to the lower end only of the cylinder, through pipe 70, the piston rises.

In the system illustrated the pump mechanism B and the valves C and D are placed under the control of a single control valve E, such as will now be described. The valve shown comprises a hollow piston 71, fitted for reciprocation in the bore 72', of a valve casing 72. The opposite ends of the bore 72' communicate through the piston and are open to a discharge passage 73. The piston is formed with two spaced heads 74 and 75 connected by a reduced portion 76, and the annular space surrounding the reduced portion 76 is maintained flooded with liquid under pressure through an annular groove 77 which is permanently connected with the pressure pipe 43, leading from the pump. A branch pipe 43' maintains communication between the pressure pipe 43 and cylinder 35. Four similar grooves 78, 79, 80 and 81, formed in the wall of the bore 72, are controlled by the head 75 of the piston 71. Groove 78 communicates with the pump control pipe 42; groove 79 communicates with pipe 54, leading to the control cylinder 53 of valve C; groove 80 communicates with pipe 69, leading to the upper end of control cylinder 67 of valve D; and groove 81 communicates with the pump control pipe 41. Pipe 70, leading to the lower end of control cylinder 67 communicates with pipe 54. A fifth groove 82, adjacent the left end of the bore 72' and controlled by the head 74, communicates with the pump control pipe 40. The piston valve 71 may be controlled in various ways but in this instance it is mainly controlled through an appropriate hand lever 83, link 84, and stem 85 connected to the left end of the valve.

The piston valve 71 may assume six positions. In the neutral position, shown in dotted lines in Figure 4, the pressure supply groove 77 only is open to the annular space between the heads 74 and 75, all of the five other grooves being open to the discharge passage 73, so that no pressure exists in any of the pipes 40, 41, 42, 54, 69 or 70. There is thus no flow of liquid in pipes 37 and 38, valve C is in the lower position of Figure 6, and valve D is in the neutral position of Figure 5. Motor cylinders 19 and 25 are both at rest. When shifted into the left extreme position shown in full lines in Figure 2, groove 82 is opened to groove 77, so that pressure is established in pipe 40 and the pump delivers liquid at a relatively high rate into pipe 37. Pipes 69 and 70 contain no pressure so that valve D is in neutral and motor cylinder 25 still remains at rest, and pipe 54 contains no pressure, so that valve C is in lower position, and liquid from pipe 37 passes through pipe 44 to drive the piston 17, and consequently the carriage 14, toward the right on a rapid return stroke.

When shifted into the right extreme position shown in full lines in Figure 4, groove 82 is opened to the discharge passage 73, and the other four grooves 78, 79, 80 and 81 are opened to pressure groove 77, so that liquid pressure is transmitted to pipes 41, 42, 54, 69 and 70. Valve D assumes the lower position of Figure 8, valve C assumes the upper position of Figure 8, and the pump delivers liquid at a relative high rate through pipe 38, to the right end of cylinder 19. The piston 17 and carriage 14 advance at a rapid rate toward the left. With valve C in elevated position communication is blocked between pipes 44 and 37, so that the liquid discharged from the left end of cylinder 19 must pass through pipe 60. Since valve D is in lower position, this liquid passes through branch pipe 60' and pipe 62 to the upper end of cylinder 25, causing the piston 23 and carriage 21 to travel downwardly. Liquid escaping from the lower end of cylinder 25, passes through pipes 63, 61, and 37 back to the pump.

When the control valve is shifted into the position shown in Figure 3, groove 81 is opened to the discharge passage 73, so that the pressure in the pump control pipe 41 is destroyed and the rate of pump discharge is reduced. The pressure remaining in pipe 42 causes the pump to discharge at a reduced but accurately controlled rate through pipe 38, and both pistons 17 and 23 continue to travel in the same direction as last described, but at a correspondingly reduced rate.

When the control valve is shifted into the position of Figure 1, groove 80 is opened to the discharge passage 73, and the consequent reduction in pressure in pipe 69, causes valve D to assume the upper position of Figure 1. The pump continues to deliver liquid at a reduced rate through pipe 38, so that piston 17 continues to advance at a reduced rate toward the left. The shifting of the valve D however reverses the piston 23, so that the piston 23 and carriage 21 then travel upwardly, at a rate corresponding to the rate of flow of liquid from cylinder 19 through pipe 60.

When the control valve is shifted into the dotted line position of Figure 2, groove 79 is opened to the discharge passage 73, and the consequent reduction in pressure in pipes 54 and 70 causes valve D to assume the neutral position of Figure 5 and the valve C to assume the lower position of Figure 6. Pipes 62 and 63 are thus blocked so that piston 23 comes to rest, but the piston 17 continues to advance toward the left under the pressure of the liquid discharged from the pump through pipe 38. The lowering of valve C opens communication between pipes 44 and 37, so that the liquid discharged from the left end of cylinder 19 returns directly to the pump.

Fluid pressure relief mechanisms are preferably provided at appropriate points in the hydraulic system. In the system shown a two-way relief valve F is connected between the pipes 37 and 38 and another valve F' between the pipes 62 and 63. One of these valves is shown in detail in Figure 7. This valve includes a block having two ports 86 and 87 therein connected through pipes 88 and 89, respectively, to the opposite sides of the circuit. A spring loaded check valve 90 controls communication between each port and a bore 91 or 92. A passage 93 maintains communication between port 86 and bore 92, and a passage 94 maintains communication between port 87 and bore 91. A spring 95 behind each valve 90 maintains a closing pressure thereon which may be varied by the usual screw 96. The arrangement is such that whenever the pressure in pipe 88 exceeds a predetermined degree, the cooperating check valve opens permitting liquid to escape therefrom through bore 91, passage 94, and port 87 into pipe 89; and similarly whenever the pressure in pipe 89 exceeds a predetermined degree, the cooperating check valve opens permitting liquid to escape therefrom through bore 92, passage 93, and port 86 into pipe 88.

A typical operation of the lathe and feed mechanism will now be briefly described. Let it be assumed that a hollow work piece W is to be internally bored and finished, the external surface X surrounding the rim is to be finished, and the end face Y of the rim is to be finished. For this particular job a roughing tool T and a finishing tool T' are fixed in the turret 15, and two finishing tools t and t' are fixed in the turret 22. The job will be divided into two operating cycles. For the first cycle the turrets 15 and 22 are so set as to bring tools T and t into play, after which both turrets will be adjusted so as to bring tools T' and t' into play for the second cycle.

Before beginning the first cycle the tool carriage 14 is set into its right extreme position, adjacent the right end of the ways 16; the collar 36' is fixed on the rod 36, at the point indicated in Figure 1; the tool carriage 21 is set into its lower retracted position against the stop 27 on the cross slide 20; stop 26 is adjusted into the position shown in Figure 1; and the stop 33 is adjusted into the position shown in this Figure. The control valve E is adjusted into the neutral position shown in dotted lines in Figure 4, and power is applied to the pump pulley 39. The pressure in pipe 43, transmitted through pipe 43' to the cylinder 35, forces the plunger 34 and cross slide 20 toward the right against the stop 33, where it is yieldably held until engaged by the collar 36', as the carriage 14 advances toward the left.

To start the first cycle the operator, by manipulating the hand lever 83, first shifts the control valve E into the full line position of Figure 4. As hereinabove explained, this causes the pump to deliver liquid at a high rate through pipe 38, to thereby effect a rapid advance of the carriage 14 toward the work. It also causes valves C and D to assume the positions shown in Figure 8 so that liquid discharged from the left end of cylinder 19 passes through pipes 45, 60, 60', and 62 to the upper end of cylinder 25 to thereby force and hold the carriage 21 against the lower stop 27. As the flow continues, the liquid passes through the relief valve F' and pipes 63, 61, and 37 back to the pump. Just before the tool T engages the work, and before the collar 36' has engaged the cross slide 20, the operator shifts the control valve E into the position of Figure 1. As above explained, this causes the pump to deliver liquid at a lower but accurate rate through pipe 38, so that the carriage 14 continues to advance at a lower accurately controlled speed appropriate for a cutting feed. It also causes the valve D to assume the upper position of Figure 1, so that the flow through pipe 45 is delivered through pipes 60, 60'', and 63 to the lower end of cylinder 25, to thereby shift the carriage 21 upwardly and hold the same against the stop 26. As the flow continues, the liquid passes through the relief valve F' and pipes 62, 61, and 37 back to the pump.

As the carriage 14 continues to advance at this reduced rate the tool T advances into the rotating work piece, and the collar 36', engaging the cross slide 20, causes the table to travel toward the left with the carriage 14, to thereby advance the tool t along the work and finish the external surface X. It will be noted that during this advance of the cross slide 20 the carriage 21 is retained in engagement with the stop 26, which thus serves as a means for accurately determining the depth of cut produced by the cutter t.

As the tool T approaches the end of the bore within the work piece W, the operator adjusts the control valve E into the full line position of Figure 2. As above explained this causes the valve D to assume the intermediate position of Figure 5, so as to block pipes 62 and 63 and thus hold piston 23 stationary. It also causes valve C to assume the lower position of Figure 6, so that pipe 44 is opened to pipe 37, and also sets up pressure in pipe 40, so that the pump then delivers liquid at a high rate through pipes 37, 44 and 45 to the left end of cylinder 19. The piston 17 and carriage 14 then travel at a rapid rate toward the right on a return stroke, the liquid from the right end of cylinder 19 returning to the pump through pipe 38. During this return movement of the carriage 14 the cross slide 20 also moves toward the right under the thrust of the plunger 34, until arrested by engagement with the stop 33. When the tool T has been withdrawn clear of the work the operator returns the control valve E into the neutral position, shown in dotted lines in Figure 4, to thereby reduce the discharge of the pump to zero and consequently bring the carriage 14 to rest.

The turrets 15 and 22 are then rotated so as to bring the tools T' and t' into the positions shown in Figure 8, and the collar 36' is adjusted into the retracted position shown in that figure. The machine is then ready for the second cycle. The operator then shifts the control valve E into the position of Figure 3. This causes the pump to deliver liquid at a relatively low rate through pipe 38 to cylinder 19, to thereby again advance the carriage 14 slowly and enter the finishing tool T' into the work. This causes the valves C and D to assume the positions shown in Figure 8, so that the liquid discharged from cylinder 19 through pipe 45, passes through pipes 60, 60', and 62 to the upper end of the cylinder 25, and the piston 23 and carriage 21 travel downwardly. The tool t' is thus fed across the end face y of the work piece to finish the same. It will be noted that the rate of movement of the carriage is thus accurately controlled since it is determined by the rate of discharge from the cylinder 19, which in turn is determined by the rate of discharge from the pump. It will also be noted that the depth of cut produced by the cutter t' is accurately determined by the stop 33, against which the cross slide 20 is held under the thrust of the plunger 34.

After both cutters T' and t' have finished their cut, the control valve E is again shifted into the return position shown in full lines in Figure 2, and the carriage 14 again travels toward the right at a relatively high rate, until again brought to rest, in the manner above described, by returning the control valve into the neutral dotted-line position of Figure 4. Both carriages 14 and 22 are then in position ready to repeat the first cycle.

A hydraulic feed system has thus been provided by which a tool carriage may alone be fed at different regulated speeds in either direction; by which a second tool carriage may at the same time be fed at different regulated speeds in either direction; by which an accurate control of the depth of cut may be had, and by which the second tool carriage may be fed in a direction at right angles to the normal feed. Various operations other than that described may be performed by this machine.

Various changes may be made in the embodiment of the invention hereinabove specifically described without departing from the invention defined in the claims appended hereto.

I claim:—

1. In a lathe the combination of a plurality of tool carriages, a separate hydraulic motor for feeding each carriage, a variable delivery pump mechanism, means adjustable to connect said motors in series with said pump mechanism to thereby simultaneously feed said carriages at definite rates, and control mechanism operable to vary pump delivery to thereby vary the rate of feed of said carriages.

2. In a lathe the combination of a plurality of tool carriages, a separate hydraulic motor for feeding each carriage, a variable delivery pump mechanism, valve means adjustable to connect said pump mechanism in driving relation with one or more of said motors, control mechanism operable to vary pump delivery, and means responsive to said control mechanism for adjusting said valve means.

3. In a lathe the combination of a tool carriage, a hydraulic motor for feeding said carriage, a variable delivery pump, hydraulic connections between said pump and motor for driving said motor in either direction, a second tool carriage, a second hydraulic motor for feeding said second carriage, means adjustable to connect said second motor in series with said first named motor, said last named means including valve mechanism adjustable to reverse said second motor, and unitary control means for varying pump delivery and for controlling said last named means and said valve mechanism.

4. In a machine tool or the like the combination of a carriage, a hydraulic motor for feeding said carriage, a variable delivery pump, hydraulic connections between said pump and motor for driving said motor, a second carriage, a second hydraulic motor for feeding said second carriage, means for connecting said second motor in series with said first named motor, said last named means including valve mechanism adjustable to reverse said second motor, and unitary control means for varying pump delivery and for controlling said valve mechanism.

5. In a machine tool or the like the combination of a carriage, a hydraulic motor for feeding said carriage, a variable delivery pump, hydraulic connections between said pump and motor for driving said motor, a second carriage, a second hydraulic motor for driving said second carriage, means for connecting said second motor in series with said first motor to maintain a definite speed relation between said motors, and control means for regulating pump delivery to regulate the speed of said first named motor.

6. In a machine tool or the like the combination of a carriage, a hydraulic motor for feeding said carriage, a pump, means for connecting said pump in driving relation with said motor, a second motor, means for connecting said second motor in series with said first named motor, and a second carriage fed by said second motor.

7. In a machine tool or the like the combination of a carriage, a hydraulic motor for feeding said carriage, means for delivering a driving liquid to said motor to operate the same, a second motor, means for transmitting the exhaust liquid from said first motor to said second motor to operate said second motor, and a carriage fed by said second motor.

8. In a machine tool or the like the combination of a carriage, a hydraulic motor for feeding said carriage, means for delivering a driving liquid to said motor at regulated rates to operate the same at any of a plurality of speeds, a second motor driven by the liquid discharged by said first motor, and means for controlling the direction of operation of said second motor independently of said first motor, and a second carriage fed by said second motor.

9. In a machine tool or the like the combination of a plurality of carriages, separate hydraulic motors for feeding said carriages, and a hydraulic system for driving said motors at regulated speeds in either direction, said system including means adjustable to connect said motors in series for simultaneous operation or to disconnect said motors to thereby render only one of said motors active.

10. In a machine tool or the like the combination of a plurality of carriages, means including a hydraulic circuit for feeding one of said carriages, means including a second hydraulic circuit for feeding another of said carriages, a switch valve adjustable to connect said circuits in series to thereby render said second named circuit active, or to disconnect said circuits to render said second named circuit inactive, and a reversing valve in said second named circuit.

11. In a machine tool or the like the combination of a carriage, a hydraulic motor for feeding said carriage, means for delivering a driving liquid to said motor to operate the same, a second hydraulic motor, means for connecting said second motor in series with said first named motor, a second carriage fed by said second motor, and means for controlling the extent of movement of said second carriage independently of said first named carriage.

12. In a machine tool or the like the combination of a carriage, a hydraulic motor for feeding said carriage, means for delivering a driving liquid to said motor to operate the same, a second hydraulic motor, means for connecting said motors in series to render said second motor active, a second carriage fed by said second motor, and a stop for limiting the movement of said second carriage.

13. In a machine tool or the like the combination of a carriage, a hydraulic motor for feeding said carriage, means for delivering a driving liquid to said motor to operate the same, a second hydraulic motor, means for connecting said motors in series to render said second motor active, a second carriage fed by said second motor, and an adjustable stop for limiting the movement of said second carriage.

14. In a machine tool or the like the combination of a carriage, a hydraulic motor for feeding said carriage, means for delivering a driving liquid to said motor to operate the same, a second hydraulic motor, means for connecting said motors in series to render said second motor active, a second carriage fed by said second motor, a stop for limiting the movement of said second carriage, and means automatically operable to permit continued movement of said first named carriage after said second carriage has been arrested by said stop.

15. In a machine tool or the like the combination of a carriage, hydraulically actuated means for feeding said carriage, a second carriage mounted independently of said first named carriage, a stop for said second carriage, and hydraulically actuated means hydraulically connectible with said first named means for retaining said second carriage against said stop during movement of said first named carriage.

16. In a machine tool or the like the combination of a carriage, hydraulically actuated means for feeding said carriage, a second carriage mounted independently of said first named carriage, means on one of said carriages coacting with the other to cause said second carriage to advance with said first named carriage, said second named carriage being movable transversely of such advance, a stop for limiting such movement, and hydraulically actuated means connected with said first named hydraulically actuated means for retaining said second carriage against said stop during the advance thereof.

17. In a machine tool or the like the combination of a carriage, hydraulically actuated means for feeding said carriage, a second carriage, a stop for limiting movement of said second carriage in one direction, fluid actuated means for yieldably maintaining said second carriage against said stop, and means on one of said carriages engageable with the other to move said second carriage away from said stop against the action of said fluid actuated means.

18. In a machine tool or the like the combination of a carriage, hydraulically actuated means for feeding said carriage, a second carriage movable toward and from said first named carriage in the direction of feed movement thereof, an adjustable stop for limiting the movement of said second carriage toward said first named carriage, means for yieldably maintaining said second carriage against said stop, and adjustable mechanism between said carriages through which said second carriage is caused to advance with said first named carriage against the action of said yieldable means.

19. In a machine tool or the like the combination of a table mounted for transverse movement, an adjustable stop for limiting such movement, means operable to position said table against said stop, a carriage on said table movable lengthwise thereof, hydraulically actuated means for feeding said carriage while said table is retained against said stop, pump mechanism for delivering a driving liquid to said last named means, and means for varying the rate of discharge of said pump mechanism to vary the rate of movement of said carriage.

20. In a machine tool or the like the combination of a support movable in one direction, an adjustable stop for limiting such movement, hydraulically actuated means for positioning said support against said stop, a member movable on said support in a direction transverse to the movement of said support, hydraulically actuated means for moving said member while said support is retained against said stop, pump mechanism for delivering a driving liquid to said last named means, and means for varying the rate of discharge of said pump mechanism to vary the rate of movement of said member.

21. In a machine tool or the like the combination of a movable support, a member movable thereon transversely of the direction of movement of said support, an adjustable stop for limiting the extent of movement of said member, hydraulically actuated means for holding said member against said stop, hydraulically actuated means for moving said support while said member is retained against said stop, pump mechanism for delivering a driving liquid to said last named hydraulically actuated means, and means for varying the rate of discharge of said pump mechanism to vary the rate of movement of said support.

22. In a machine tool or the like the combination of a movable member, hydraulically actuated means for driving said member, pump mechanism for delivering a driving liquid to said means to drive said member at predetermined rates, means for regulating the rate of discharge of said pump mechanism to regulate the rate of movement of said member, a second movable member, means actuated by liquid discharged from said hydraulically actuated means for driving said second member, a stop for arresting the movement of one of said members in one direction, and means automatically operable to permit continued movement of the other of said members after arresting the movement of one of said members by the action of said stop.

23. In a machine tool or the like the combination of a movable member, a hydraulic motor for driving said member, means for delivering a driving liquid to said motor at a regulated rate to regulate the rate of movement of said member, a second movable member, a second hydraulic motor for driving the same, and hydraulic connections through which said second motor is driven by liquid discharged from said first named motor to effect movement of said second motor at a rate corresponding to the rate of movement of said first named motor.

24. The combination of a hydraulic motor, a variable displacement pump for delivering a driving liquid to said motor, means for varying pump displacement to vary the rate of operation of said motor, and a second motor driven by liquid discharged from said first named motor to effect operation thereof at a rate corresponding to the rate of operation of said first named motor.

In witness whereof, I hereunto subscribe my name this 31st day of July, 1926.

WALTER FERRIS.